United States Patent [19]

Kinoshita et al.

[11] Patent Number: 5,364,059
[45] Date of Patent: Nov. 15, 1994

[54] EQUIPMENT SUPPORT STRUCTURE

[75] Inventors: Shigeo Kinoshita, Ohmiya; Takahiro Asano, Urawa; Sadamu Matsuda, Tokyo; Wataru Watanabe, Ageo, all of Japan

[73] Assignee: Clarion Co., Ltd., Tokyo, Japan

[21] Appl. No.: 610,516

[22] Filed: Nov. 8, 1990

[30] Foreign Application Priority Data

Nov. 8, 1989 [JP] Japan .............. 1-130225[U]

[51] Int. Cl.⁵ .................................. G11B 33/02
[52] U.S. Cl. ........................ 248/584; 248/610; 248/638; 369/75.1
[58] Field of Search ............ 248/626, 562, 610, 618, 248/638, 636, 624, 635; 267/174, 178, 584; 369/75.1, 263

[56] References Cited

U.S. PATENT DOCUMENTS

| | | | |
|---|---|---|---|
| 1,554,501 | 9/1925 | Horle et al. | 248/610 X |
| 2,526,048 | 10/1950 | Russell | 248/610 X |
| 2,634,906 | 4/1953 | Heiman | 248/610 X |
| 3,185,415 | 5/1965 | Thorn | 248/645 X |
| 3,509,742 | 5/1970 | Bauer | 248/562 |
| 3,519,239 | 7/1970 | Rohrer | 248/610 X |
| 4,729,538 | 3/1988 | Bergacker | 248/562 |
| 4,794,588 | 12/1988 | Yoshitoshi et al. | 369/263 |
| 4,796,849 | 1/1989 | Fonassier | 248/638 X |
| 4,941,640 | 7/1990 | Nakamura | 248/562 |
| 5,042,024 | 8/1991 | Kurosawa et al. | 369/75.1 |
| 5,067,065 | 11/1991 | Dahlgren | 248/624 X |

*Primary Examiner*—Ramon O. Ramirez
*Assistant Examiner*—Derek J. Berger
*Attorney, Agent, or Firm*—Price, Gess & Ubell

[57] ABSTRACT

An equipment support structure capable of permitting the vertical arrangement or orientation of a damper spring to be readily carried out irrespective of the posture of setting of an equipment, A damper link which is pivotally moved depending upon the position of setting of an equipment is pivotally mounted at the proximal end thereof on one of the equipment and mount for supporting the equipment through dampers and a damper spring is provided between the damper link and the other of the mount and equipment for offsetting load applied from the equipment to the dampers and operatively connected to the damper ling so as to be pivotally moved in association with the damper link.

35 Claims, 7 Drawing Sheets

EQUIPMENT SUPPORT STRUCTURE

BACKGROUND OF THE INVENTION

1. Field of the Invention

This invention relates to an equipment support structure, and more particularly to an equipment support structure of the type which includes a damper spring for offsetting load applied from an equipment to a damper.

2. Description of Related Art

Generally, in equipment such as precision machinery, for example, a player for playing back a record medium or the like, it is highly desirable to minimize or substantially prevent transmission of external vibration to the equipment. For example, when a compact disc (CD) player which has been recently widely sold, has applied thereto external vibration during the playing-back of a compact. disc, a failure in reproducing a part of a signal stored on the compact disc due to skipping or the like occurs in reading-out of data. For this reason, in the installation of a compact disc player of the vehicle mounted type which is adapted to be mounted on a vehicle capable of generating vibration, equipment support structure is used which is constructed so as to support the player on a mount provided on the side of a vehicle through a damper means which exhibits vibration absorbing ability. The equipment support structure is adapted to cause the damper means to absorb vibration generated from the vehicle to prevent it from being transmitted to the player, resulting in ensuring positive playing-back of the compact disc and protection of both player and compact disc.

Also, such an equipment support structure typically includes a damper spring arranged between the equipment and the mount. The damper spring is engaged at both ends thereof with the center of gravity of the equipment and the mount, respectively, to thereby cancel load applied from the equipment to the damper means. This prevents the load of the equipment from acting directly on the damper means, to thereby prevent deformation of the damper means. Also, the damper spring serves to hold the damper means at a proper position due to its urging force, to thereby prevent the damper means from being exhausted to a degree sufficient to cause the vibration absorbing ability of the damper means to be biased.

Conventionally, as a mount through which the equipment is mounted on the vehicle or the like, an upright or vertical type mount, a horizontal type mount and the like are selectively used depending on a mounting space. Thus, the posture or position of installation or setting of the equipment depends upon the mount used. In order to cause the damper spring to cancel load of the equipment acting on the damper means, it is required to constantly vertically arrange or orientate the damper spring. Therefore, when one type mount is replaced with another type mount, it is required to vary the position of setting of the damper spring. This is generally carried out through a highly troublesome procedure of detaching the damper spring from the one mount, varying the direction of setting of the damper spring and then attaching it to the other mount.

Also, such replacement is manually carried out. However, because the damper spring must be constructed so as to exhibit an urging force sufficiently large to cancel load of the equipment, the handling of the damper spring by manual operation is very troublesome, resulting in operation efficiency being substantially deteriorated.

SUMMARY OF THE INVENTION

The present invention has been made in view of the foregoing disadvantages of the prior art.

Accordingly, it is an object of the present invention to provide an equipment support structure which is capable of being readily accommodated to various equipment setting positions or postures.

It is another object of the present invention to provide an equipment support structure which is capable of permitting the vertical arrangement or orientation of a damper spring to be readily carried out irrespective of the posture or setting of an equipment.

It is a further object of the present invention to provide an equipment support structure which is capable of accomplishing the above-described objects with a simple construction.

In accordance with the present invention, an equipment support structure is provided. The equipment support structure includes a damper means through which equipment is mounted on a mount, a damper spring for offsetting any load of the equipment applied to the damper means, and a link pivotally mounted on one of the mount and equipment so as to be pivotally moved depending upon the position or setting of the equipment. The damper spring is arranged between the link and the other of the mount and equipment so as to be pivotally moved in association with the pivotal movement of the link.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals-designate like or corresponding parts throughout; wherein.

DETAILED DESCRIPTION OF THE PREFERRED EMBODIMENTS

Now, an equipment support mechanism according to the present invention will be described hereinafter with reference to the accompanying drawings.

Figure 1:
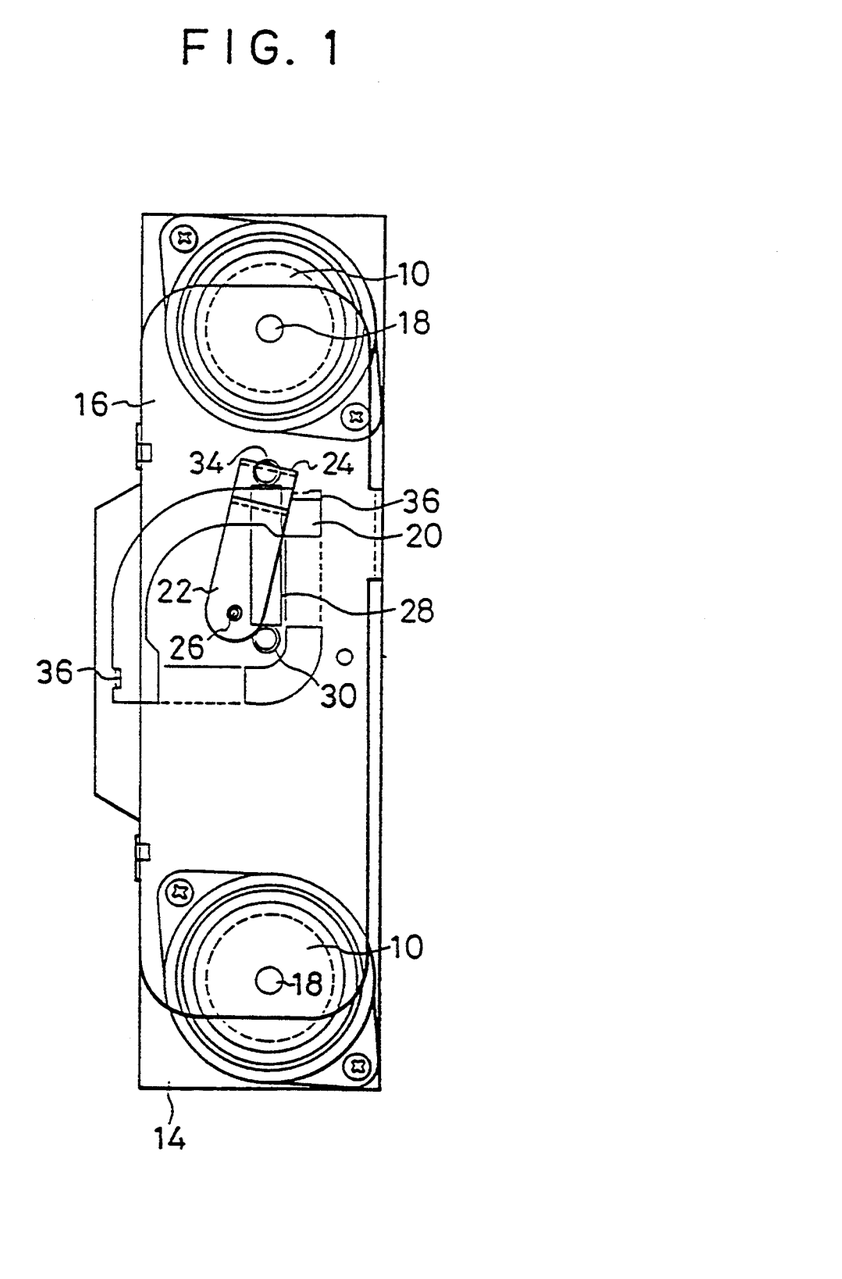
FIG. 1 is a front elevation view showing an embodiment of an equipment support structure according to the present invention, which is arranged so as to support an equipment of the upright type through a side of the equipment thereon.
Figure 2:
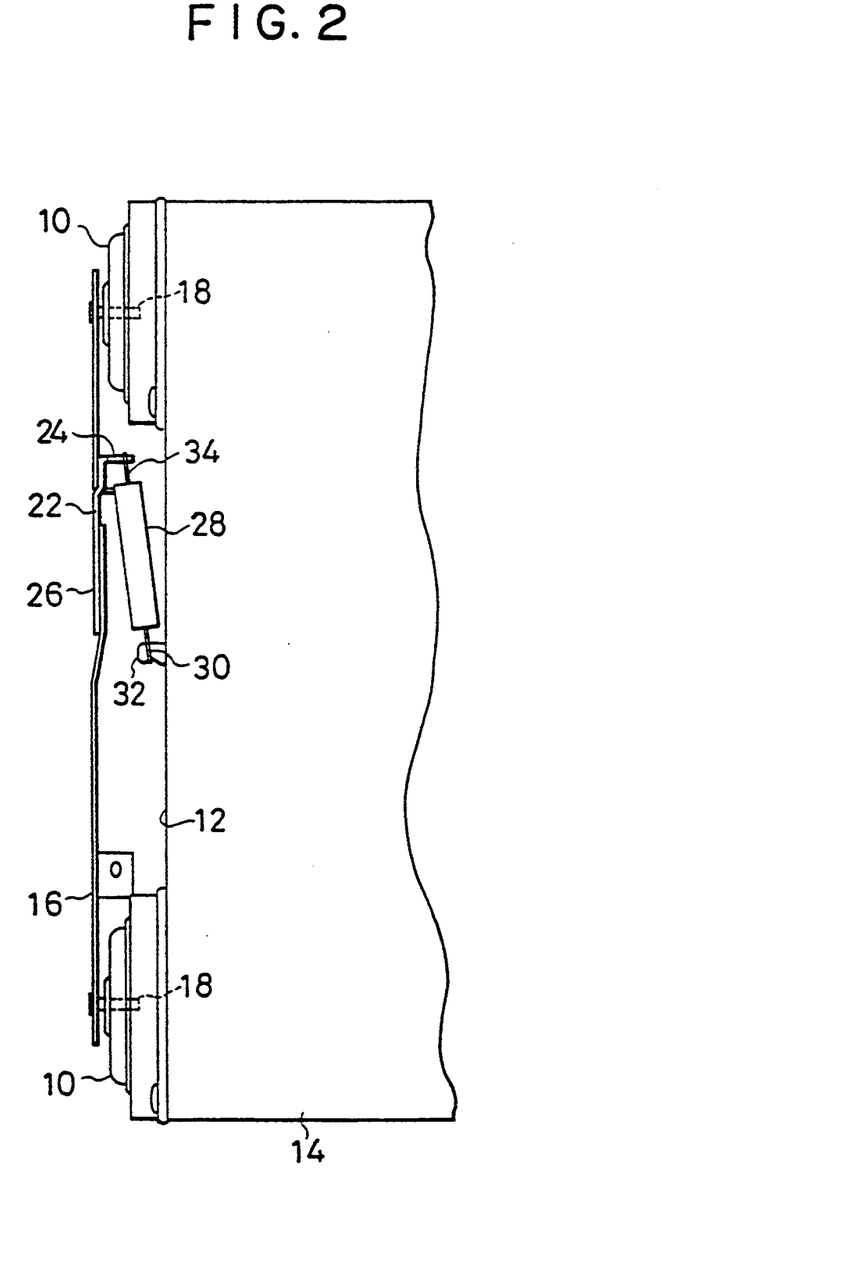
FIG. 2 is a side elevation view of the equipment support structure shown in FIG. 1.
Figure 3:
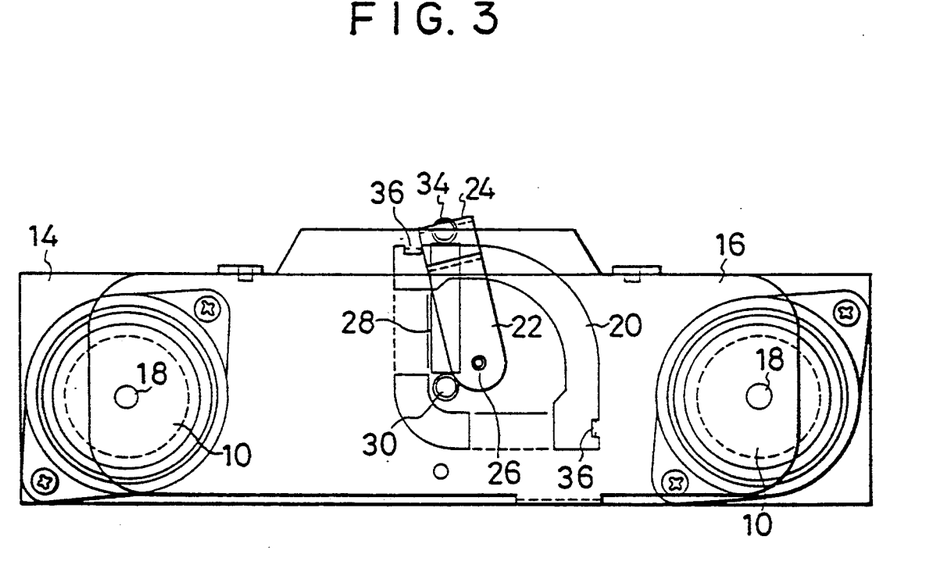
FIG. 3 is a front elevation view of the equipment support structure shown in FIG. 1, in which the arrangement is varied so as to support equipment of a horizontal type thereon.

FIGS. 1 to 3 show an embodiment of an equipment support mechanism according to the present invention, which is adapted to be variably arranged between a position shown in FIGS. 1 and 2 for supporting an equipment of the upright type and that shown in FIG. 3 for supporting equipment of the horizontal type. More particularly, the equipment support mechanism of the illustrated embodiment is constructed so as to support thereon both an equipment of the upright type of which the longitudinal axis extends in the vertical direction and equipment of the horizontal type of which the longitudinal axis extends in the horizontal direction.

For this purpose, the equipment support structure of the illustrated embodiment includes at least one damper 10 acting as a vibration absorbing element. In the illustrated embodiment, two such dampers 10 are provided on both vertical ends of each of both sides 12 of a piece of equipment 14 to be supported by the equipment support structure, to thereby prevent vibration from being transmitting to the equipment 14. The dampers 10 each are engaged with or connected to a damper plate 16 through a pin 18 mounted on the damper plate 16 so as to extend therefrom toward the equipment 14. The damper plate 16 is mounted on a mount (not shown) provided on the side of a vehicle or the like and formed at the central portion thereof with a guide 20. In the illustrated embodiment, the guide 20 comprises an arcuate aperture so as to extend over an angular range of 90°.

The equipment support structure of the illustrated embodiment also includes a link or damper link 22 pivotally arranged so as to extend on both sides of the damper plate 16 through the aperture 20 of the damper plate 16, so that it may be pivotally moved at the distal end 24 thereof about the proximal end 26 thereof over the angular range of 90 degrees through the arcuate aperture 20. Thus, the arcuate aperture 20 serves as a guide for pivotally moving the damper link 22 therethrough. In the illustrated embodiment, the damper link 22 is mounted at the proximal end 26 thereof on the damper plate 16, and the proximal end 26 of the damper link 22 is positioned outside the damper plate 16 and the distal end 24 is positioned inside the plate 16.

Further, the equipment support structure of the embodiment includes a damper spring 28 arranged between the damper plate 16 and the dampers 10 in a manner to extend vertically or perpendicular to a direction of load of the equipment 14 applied to the dampers 10. The damper spring 28 is so arranged that its proximal end 30 is mounted on the equipment 14 so as to be positioned at substantially the center of gravity of the equipment 14. In the illustrated embodiment, the proximal end 30 of the damper spring 28 is engagedly held on a hook 32 mounted on the equipment 14. Also, the damper spring 28 is operatively connected at the distal end 34 thereof to the distal end 24 of the damper link 22, resulting in being pivotally moved about the proximal end 30 in association with the pivotal movement of the damper link 22. The damper spring 28 constructed as described above functions to cancel load applied from the equipment 14 to the dampers 10 and constantly hold the dampers 10 at an appropriate position relative to the damper plate 16.

Further, in the illustrated embodiment, the arcuate aperture 20 of the damper plate 16 is provided at each end thereof with a stopper 36, against which the damper link 22, when reaching each end of the stroke of pivotal movement thereof is engagedly abutted, resulting in being held at the stroke end. Thus, the stoppers 36 serves as a lock means for regulating the pivotal movement of the link 22.

As described above, the damper link 22 and damper spring 28 are engaged with each other through the respective distal ends 24 and 34, so that the damper spring 28 may be pivotally moved in association with the pivotal movement of the damper link 22. In illustrated embodiment, the damper link 22 is so positioned that its proximal end 26 about which the link is pivotally moved is deviated toward the distal ends 24 and 34 of the link 22 and spring 28 from the proximal end 30 of the damper spring 28 about which the damper spring 28 is pivotally moved. Such construction causes the stroke of pivotal movement of the distal end 24 of the damper link 22 to be reduced or shortened as compared with that of the distal end 34 of the damper spring 28. This results in an urging force applied from the damper spring 28 to the damper link 22 when the damper link 22 is abutted at the distal end 24 against the stopper 36 being directed toward the stopper 36, so that the holding of the damper link 22 on the stopper 36 may be positively carried out.

Now, the manner of operation of the equipment support structure of the illustrated embodiment will be described hereinafter with reference to FIGS. 1 to 3.

When the equipment support structure which is arranged so as to support the equipment 10 of an upright type as shown in FIGS. 1 and 2 is to be used for supporting an equipment 10 of the horizontal type as shown in FIG. 3, the damper link 22 is pivotally moved manually or using a suitable means such as a screw driver or the like to a position shown in FIG. 3, leading to pivotal movement of the damper spring 28 in association with the pivotal movement of the damper link 22. This causes the damper link 22 to be abuttedly engaged with the stopper 36, resulting in the damper spring being held in the vertical direction as shown in FIG. 3. At this time, the elastic force of the damper spring 28 is directed in a direction toward the stopper 36, to thereby urge the damper link 22 in the direction of pivotal movement thereof, because the proximal end 26 of the damper link 22 and the proximal end 30 of the damper spring 28 are deviated from each other. Also, when the proximal end 26 of the damper link 22 is abutted against the stopper 36, the elastic force of the damper spring 28 is applied to the damper link 22, leading to a secure holding of the damper link 22 on the stopper 36.

As will be noted from the above, in order to accommodate the equipment support structure of the illustrated embodiment to equipment of which setting angles are different by 90 degrees from each other, it is merely required to pivotally move the damper link by 90 degrees, resulting in the damper spring being constantly vertically held with respect to each of the equipments. Thus, it will be understood that the embodiment effectively eliminates, when the posture of setting of equipment support structure is to be varied, the troublesome operation of detaching the distal end of the damper spring from one mount, varying the angle of setting of the damper spring and then mounting the damper spring on another mount, as encountered with the prior art. Also, in the embodiment, the proximal end 26 of the damper link 22 is deviated from the proximal end 30 of the damper spring 28, so that the elastic force of the damper spring 28 causes the damper link 22 to be more securely held on the stopper 36.

Figure 4:
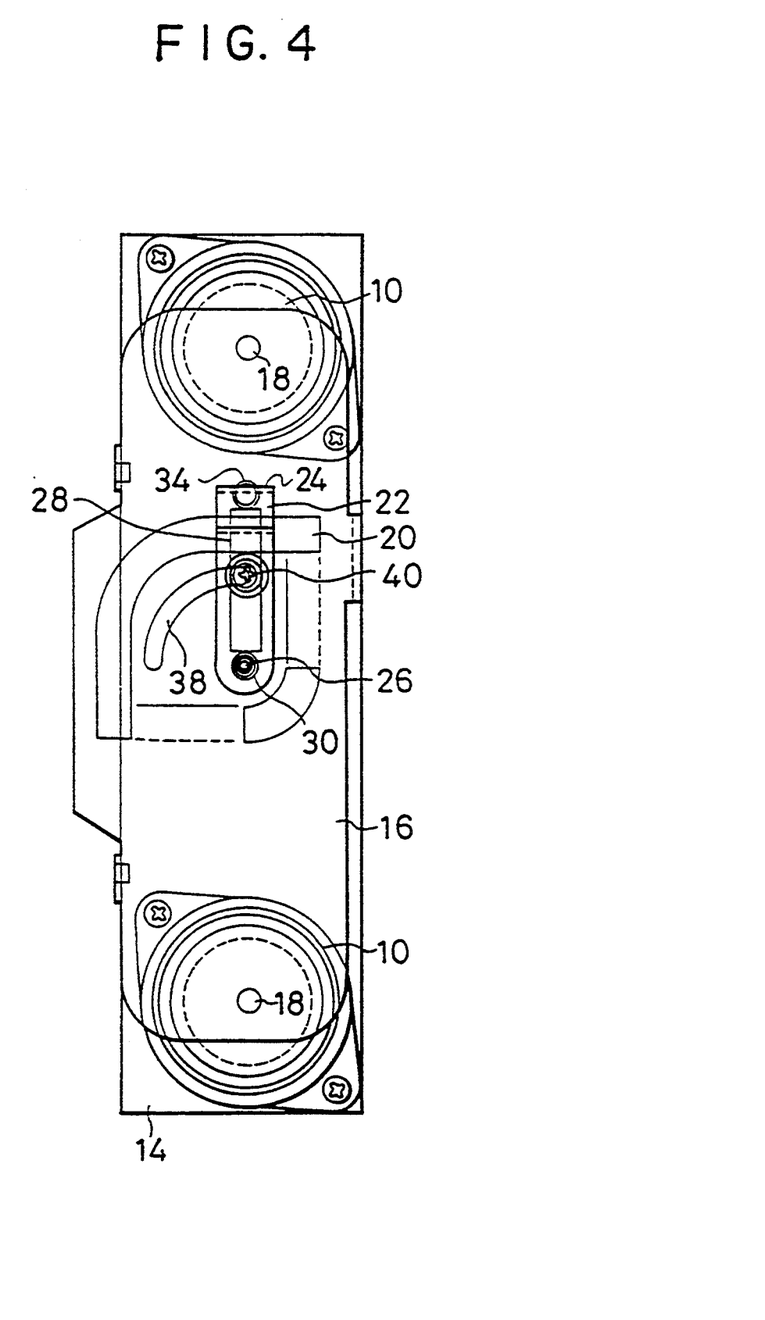
FIG. 4 is a front elevation view showing another embodiment of an equipment support structure according to the present invention, which is arranged so as to support equipment of the upright type through a side of the equipment thereon.
Figure 5:
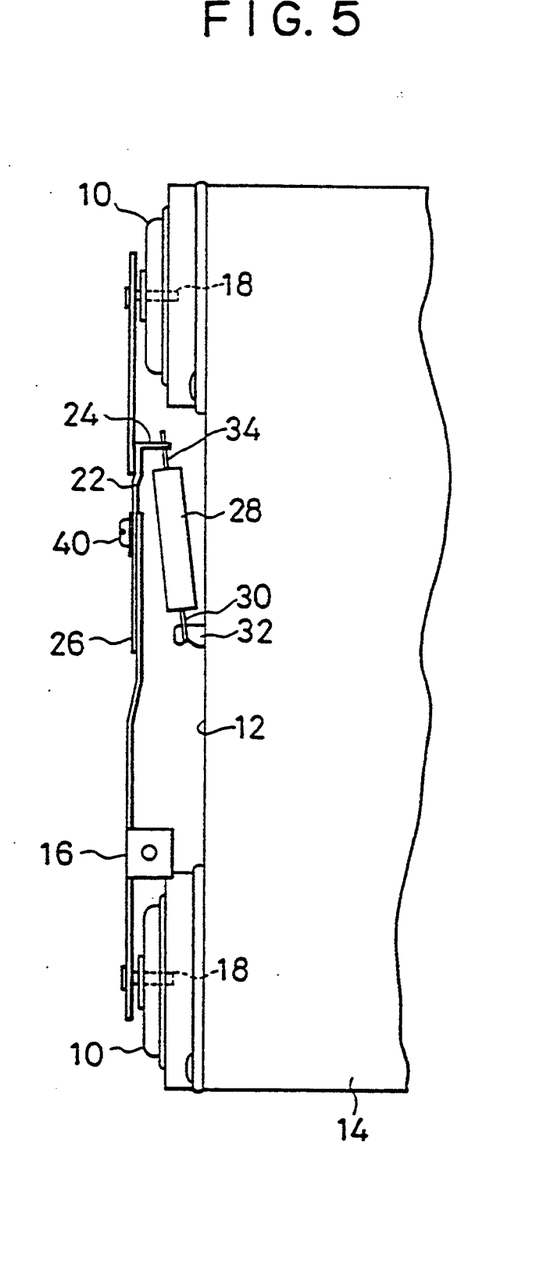
FIG. 5 is a side elevation view of the equipment support structure shown in FIG. 4.
Figure 6:
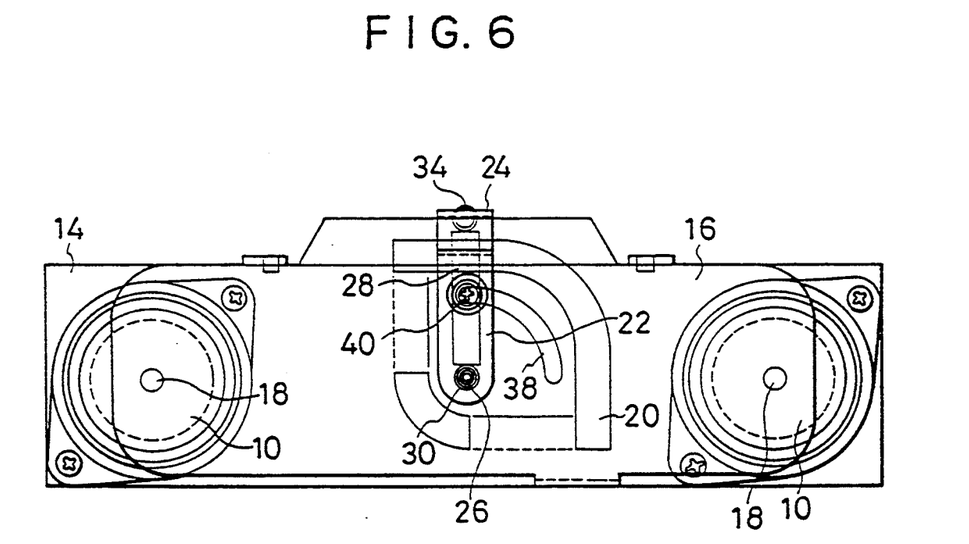
FIG. 6 is a front elevation view of the equipment support structure shown in FIG. 4, in which arrangement is varied so as to support an equipment of a horizontal type thereon.
Figure 7:
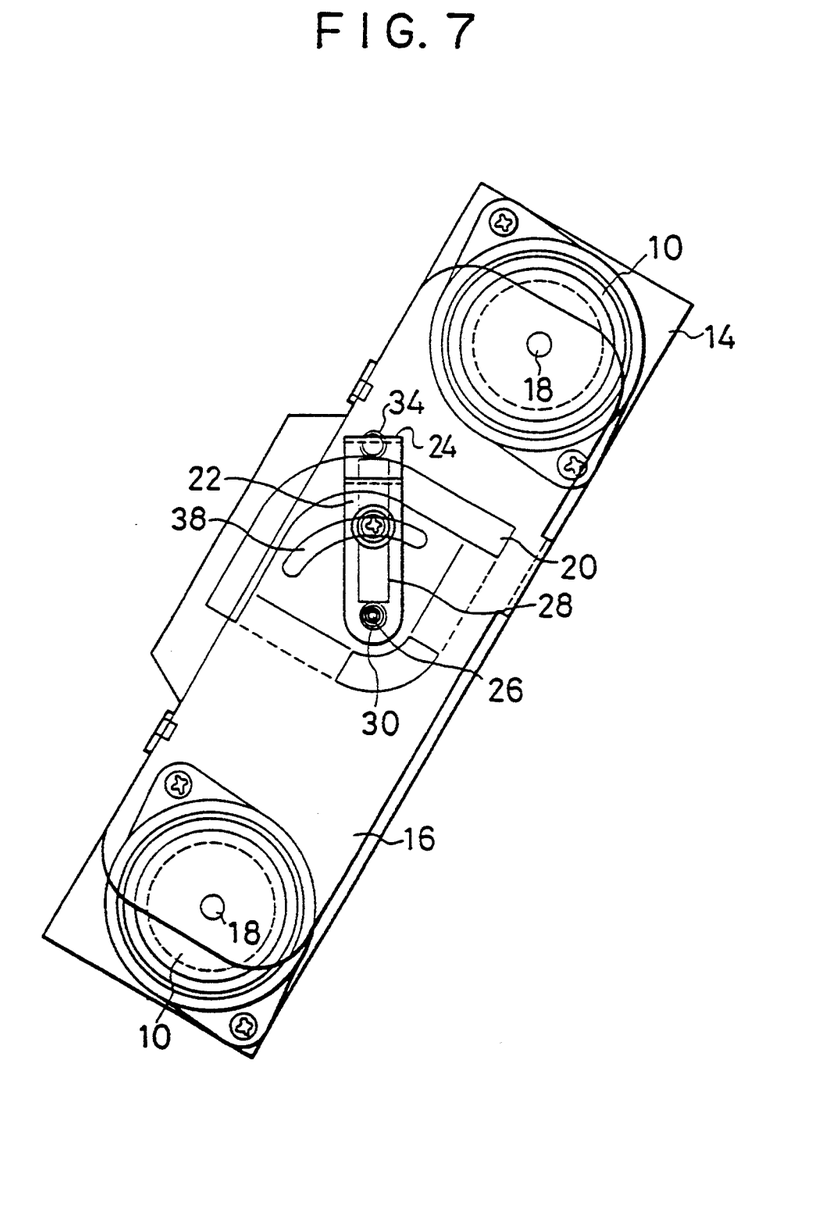
FIG. 7 is a front elevation view of the equipment support structure shown in FIG. 4, of which arrangement is varied so as to support an equipment of the oblique type thereon.

FIGS. 4 to 7 show another embodiment of an equipment support structure according to the present invention, which is constructed in such a manner that the proximal end 26 of a damper link 22 is positioned on a line defined by connecting the proximal end 30 of a damper spring 28 and its distal end 34 to each other. In the illustrated embodiment, the proximal end 26 of the damper link 22 coincides with or is positioned on the proximal end 30 of the damper spring 28. Also, in the embodiment, a damper plate 16 is formed at the portion thereof between the proximal end 26 of the damper link 22 and an arcuate aperture 20 with an additional arcuate aperture 38 of a scaled-down shape similar to the aperture 20. In the aperture 38 is movably fitted a screw 40, which is tightened to hold the damper link 22 at a desired position, resulting in functioning as a lock means for regulating the pivotal movement of the damper link 22. For this purpose, the screw 40 may be inserted through the damper link 22 as shown in FIGS. 4 and 5.

The remaining part of the embodiment may be constructed in substantially the same manner as the embodiment shown in FIGS. 1 to 3.

In the embodiment of FIGS. 4 and 5 constructed as described above, when the screw 40 is released, the damper link 22 may be pivotally moved, resulting in the damper spring 28 being likewise pivotally moved. The proximal end 26 of the damper link 22 is positioned so as to coincide with the proximal end 30 of the damper spring 28, so that the equipment support structure of the embodiment may be varied from the position for supporting an equipment of the upright or vertical type shown in FIGS. 4 and 5 to an oblique position for supporting an equipment of the oblique type shown in FIG. 7 as well as a position for supporting an equipment of the horizontal type shown in FIG. 6. At each of the positions, the damper spring 28 is kept vertical. Thus, the structure of the embodiment permits the damper spring 28 to be constantly vertically set irrespective of the angle of installation or setting of an equipment.

In the embodiments described above, the equipment support structure is provided on the damper plate, however, the present invention is not limited to such construction. The link may be arranged on any one of the mount and equipment. For example, the link may be so arranged that the proximal end thereof is positioned at the center of gravity of the equipment and the damper spring may be provided on the side of the mount. Such arrangement likewise exhibits substantially the same function and advantage.

As can be seen from the foregoing, the present invention is constructed in the simple manner so that the link, which is pivotally moved depending upon the position of setting of an equipment, is pivotally mounted at the proximal end thereof on one of the equipment and mount for supporting the equipment through the damper means and the damper spring is arranged between the link and the other of the mount and equipment for offsetting any load applied from the equipment to the damper means. Such construction permits the angle of setting of the damper spring to be varied depending upon the particular equipment by merely pivotally moving the link to keep the damper spring vertical, resulting in the operation of varying the angle of setting of the damper spring being accomplished with high efficiency.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An audio electronic equipment supporting structure for mounting audio electronic equipment in a vehicle to be relatively free from the adverse effects of vibrations, comprising:

a damper assembly for absorbing vibration;

a damper plate connected to the damper assembly for extending along a side of the audio electronic equipment;

a link member pivotally connected to the damper plate and movable over a predetermined range of travel;

spring means capable of connecting the link member to the audio electronic equipment, whereby a spring force lessens any weight of the audio electronic equipment that could act on the damper assembly, and means for positioning the link member to apply the force of the spring means in a vertical axis to counter any weight of the audio electronic equipment regardless of either an upright vertical mounting or a horizontal mounting of the audio electronic equipment.

2. The supporting structure of claim 1 wherein the damper plate has an aperture and the link member is pivotally mounted to the damper plate on one side of the aperture and extends through the aperture to connect with the spring means for providing a force.

3. The support structure of claim 1 wherein the damper assembly includes a pair of damper members and the damper plate is respectively connected to each damper member.

4. The support structure of claim 1 wherein the means for positioning includes an arcuate opening in the damper plate.

5. The support structure of claim 4 further including a stopper member at either end of the arcuate opening.

6. An equipment support structure for isolating equipment from vibrations relative to a support mount comprising:

a damper means for connecting the equipment to the support mount for damping vibration in the equipment relative to the support mount, with the weight of said equipment imparting a load to said damping means along a load direction;

a link for pivotally mounting on one of the support mount and the equipment, said link being pivotally movable depending upon a predetermined alignment of the equipment;

a damper spring for connecting said link and the other of the mount and equipment, said damper spring being vertically orientated for offsetting said load of the equipment imparted to said damper means along said load direction, said damper spring being pivotally moved, in association with the pivotal movement of said link, to an alignment with a vertical axis to oppose said load; and means for locking said link to maintain said damper spring in alignment with said vertical axis.

7. An equipment support structure as defined in claim 6, wherein said link is so arranged that a distal end is pivotally moved about a proximal end thereof;

said dampler spring being supported at the proximal end thereof as the center of pivotal movement thereof and operatively connected at the distal end thereof to the distal end of said link.

8. An equipment support structure as defined in claim 7, further comprising a damper plate for connecting a portion of the mount with said damper means;

said damper plate being formed with an aperture in a manner to correspond to the stroke of pivotal movement of said link, to thereby guide the pivotal movement of said link therethrough.

9. An equipment support structure as defined in claim 8, wherein said aperture is formed into an arcuate shape so as to extend over an angular range which permits pivoting of the link when the damper spring is pivoted between vertical and horizontal directions.

10. An equipment support structure as defined in claim 8, wherein said damper spring is arranged between said damper plate and said damper means in a manner to be parallel to a direction of load applied from the equipment to said damper means.

11. An equipment support structure as defined in claim 8, further comprising means for locking the distal end of said link against one of a pair of opposing ends of said aperture.

12. An equipment support structure as defined in claim 7, further comprising a damper plate for connecting a portion of the mount with said damper means;

said damper plate being formed with an aperture in a manner to correspond to a stroke of pivotal movement of said link, to thereby guide the pivotal movement of said link therethrough;

said damper plate being also formed at the portion thereof between the proximal end of said damper link and said aperture with an additional aperture of a scaled-down shape similar to said aperture.

13. An equipment support structure as defined in claim 12, wherein said lock means comprising a screw movably fitted in said additional aperture and releasably tightened to hold said link at a desired position.

14. An equipment support structure as defined in claim 13, wherein said apertures each are formed into an arcuate shape so as to extend over an angular range which permits pivoting of the link when the damper spring is pivoted between vertical and horizontal directions.

15. An equipment support structure as defined in claim 13, wherein said damper spring is arranged between said damper plate and said damper means in a manner to be parallel to a direction of load applied from the equipment to said damper means.

16. An equipment support structure as defined in claim 13, wherein said link is so arranged that the proximal end thereof is positioned on a line defined by connecting the proximal end and distal end of said damper spring to each other.

17. An equipment support structure as defined in claim 17, wherein said apertures each are formed into an arcuate shape so as to extend over an angular range of 90 degrees which permits pivoting of the link when the damper spring is pivoted between vertical and horizontal directions.

18. An equipment support structure as defined in claim 12, wherein said damper spring is arranged between said damper plate and said damper means in a manner to be parallel to a direction of load applied from the equipment to said damper means.

19. An equipment support structure as defined in claim 12, wherein said link is so arranged that the proximal end thereof is positioned on a line defined by connecting the proximal end and distal end of said damper spring to each other.

20. An equipment support structure as defined in claim 19, wherein the proximal end of said link is positioned so as to coincide with the proximal end of said damper spring.

21. An equipment support structure as defined in claim 6, wherein said link being so arranged that a distal end thereof is pivotally moved about a proximal end thereof;

said damper spring being supported at a proximal end thereof as the center of pivotal movement thereof and operatively connected at a distal end thereof to said distal end of said link.

22. An equipment support structure as defined in claim 21, further comprising a damper plate for connecting a portion of the mount with said damper means;

said damper plate being formed with an aperture in a manner to correspond to the stroke of pivotal movement of said link, to thereby guide the pivotal movement of said link therethrough;

said lock means comprising stoppers provided at both ends of said aperture.

23. An equipment support structure as defined in claim 22, wherein said aperture is formed into an arcuate shape so as to extend over an angular range which permits pivoting of the link when the damper spring is pivoted between vertical and horizontal directions.

24. An equipment support structure as defined in claim 22, wherein said damper spring is arranged between said damper plate and said damper means in a manner to be parallel to a direction of load applied from the equipment to said damper means.

25. An equipment support structure as defined in claim 22, further comprising means for locking the distal end of said link against one of a pair of opposing ends of said aperture.

26. An equipment support structure for isolating equipment from vibrations relative to a support mount comprising:

a support mount;

a damper means for connecting the equipment to the support mount for dampening vibration in the equipment relative to the support mount, with the weight of said equipment imparting a load to said damper means along a load direction;

a link having a proximal end pivotally mounted on one of the support mount and the equipment;

a damper spring having a proximal end for mounting to the other end of the support mount and equipment and having a distal end operatively connected to a distal end of said link, said damper spring being vertically orientated for offsetting said load imparted to said damper means, said damper spring being pivotally moved in association with pivotal movement of said link;

a damper plate connecting a portion of the mount with said damper means and formed with an aperture for guiding the pivotal movement of said link therethrough;

said aperture having an arcuate shape extending over an angular range which permits pivoting of the link when the damper spring is pivoted between vertical and horizontal directions; said aperture being provided at both ends thereof with stoppers; and means for locking the distal end of said link against one of said stoppers.

27. An equipment support structure for isolating equipment from vibrations relative to a support mount comprising:
   a support mount;
   a damper means connecting the equipment to the support mount for dampening vibration in the equipment, with the weight of said equipment imparting a load to said damper means along a load direction;
   a damper spring for offsetting the load of the equipment imparted to said damper means;
   a link having a proximal end pivotally mounted on one of the support mount and the equipment;
   said damper spring having a proximal end mounted to the other of the support mount and equipment and having a distal end operatively connected to a distal end of said link so that the damper spring may be pivotally moved in association with pivotal movement of said link;
   a damper plate connecting a portion of the mount with said damper means and having a first aperture for guiding the pivotal movement of said link therethrough;
   said damper plate having a second aperture formed between the proximal end of said damper link and said first aperture with the second aperture of a scaled-down shape similar to said first aperture;
   said apertures each having an arcuate shape subtending an angular range of 90 degrees; and
   a lock means for regulating the pivotal movement of said link;
   said lock means comprising a screw movably fitted in said additional aperture and releasably tightened to hold said link at a desired position;
   said damper spring being vertically orientated to be parallel to said load direction applied from the equipment to said damper means;
   the proximal end of said link being positioned on a line connecting the proximal and distal ends of said damper spring.

28. An equipment support structure for isolating equipment from vibrations comprising:
   a support mount;
   a damper means connecting the equipment to the support mount for dampening vibration of the equipment relative to the support mount, the weight of said equipment imparting a load to said damper means along a load direction;
   a link having a proximal end pivotally mounted on the support mount;
   a damper spring, capable of connecting a distal end of the link and the equipment, said damper spring being vertically orientated so as to be parallel to said load direction for offsetting said load to limit the effect of said load on said damper means; and
   a lock means for fixing the distal end of the link at a desired position with respect to the support mount, with said link being fixed at the desired position in accordance with the direction of the load for vertically orienting said spring along said load direction to offset the load of the equipment.

29. The equipment support structure of claim 28 wherein the lock means comprises stoppers which limit pivotal movement of the link, with the proximal end of the link pivotally mounted on the support mount at a position relative to said stoppers, whereby the link is pressed against a respective stopper while said link abuts said respective stopper.

30. The equipment support structure of claim 28 wherein the lock means comprises a screw for fixing the link at the desired position with respect to the support mount.

31. The equipment support structure of claim 28 wherein the support mount includes an arcuate aperture, and wherein the link extends through the aperture with the proximal end of the link on one side of the support mount and the distal end of the link and the damper spring on an opposing side of the support mount.

32. An equipment support structure for isolating equipment from vibrations comprising:
   a support mount;
   a damper means capable of connecting the equipment to the support mount for dampening vibration of the equipment relative to the support mount, the weight of said equipment imparting a load to said damper means along a load direction;
   a link having a proximal end pivotally mounted on the equipment;
   a damper spring, connecting a distal end of the link and the support mount, said damper spring being orientated vertically so as to be parallel to said load direction for offsetting said load to limit the effect of said load on said damper means; and
   a lock means for fixing the distal end of the link at a desired position with respect to the equipment, with said link being fixed at the desired position in accordance with the direction of the load for orienting said spring in a vertical axis to offset any load of the equipment, such that the load can be offset regardless of whether the equipment is oriented vertically or horizontally.

33. The equipment support structure of claim 32 wherein the lock means comprises stoppers which limit pivotal movement of the link, with the proximal end of the link pivotally mounted on the support mount at a position relative to said stoppers, whereby the link is pressed against a respective stopper while said link abuts said respective stopper.

34. The equipment support structure of claim 33 wherein the lock means comprises a screw for fixing the link at the desired position with respect to the support mount.

35. The equipment support structure of claim 33 wherein the support mount includes an arcuate aperture, and wherein the link extends through the aperture with the proximal end of the link on one side of the support mount and the distal end of the link and the damper spring on an opposing side of the support mount.

* * * * *